United States Patent
Calciu et al.

(10) Patent No.: US 9,954,762 B2
(45) Date of Patent: Apr. 24, 2018

(54) POPULATING FORWARDING DATABASE TABLES IN A FABRIC ENVIRONMENT

(71) Applicant: Lenovo Enterprise Solutions (Singapore) Pte. Ltd., Singapore (SG)

(72) Inventors: Corneliu-Ilie Calciu, Bucharest (RO); Radu Mihai Iorga, Bucharest (RO)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 198 days.

(21) Appl. No.: 14/747,045

(22) Filed: Jun. 23, 2015

(65) Prior Publication Data
US 2016/0380876 A1    Dec. 29, 2016

(51) Int. Cl.
*H04L 12/755* (2013.01)
*H04L 12/741* (2013.01)

(52) U.S. Cl.
CPC ............ *H04L 45/021* (2013.01); *H04L 45/54* (2013.01)

(58) Field of Classification Search
None
See application file for complete search history.

(56) References Cited

U.S. PATENT DOCUMENTS

| | | | |
|---|---|---|---|
| 6,128,296 A | 10/2000 | Daruwalla et al. | |
| 6,445,715 B1 * | 9/2002 | Annaamalai | H04L 12/4633 370/466 |
| 6,560,229 B1 | 5/2003 | Kadambi et al. | |
| 6,999,455 B2 | 2/2006 | Sampath et al. | |
| 8,103,800 B2 | 1/2012 | Tzeng et al. | |
| 2007/0153741 A1 * | 7/2007 | Blanchette | H04L 45/66 370/331 |
| 2012/0250684 A1 * | 10/2012 | Ogura | H04L 12/4625 370/390 |
| 2014/0289193 A1 * | 9/2014 | Zhou | H04L 45/021 707/612 |
| 2015/0156108 A1 * | 6/2015 | Shi | H04L 12/4658 370/218 |

* cited by examiner

*Primary Examiner* — Donald Mills
(74) *Attorney, Agent, or Firm* — Jeffrey L. Streets

(57) ABSTRACT

A method includes each switch in a network maintaining a forwarding database table in which each record identifies a media access control (MAC) address, a port identifier, and a source identifier. A frame is received from a first network device at a first port of a first switch, wherein the frame includes a MAC address of the first network device. The first switch prepares a synchronization packet including the MAC address, a port identifier identifying the first port, a source identifier identifying the first switch and an instruction, in response to determining that the MAC address is not associated with the first switch in the first forwarding database table. The synchronization packet is sent to each other switch, and the forwarding database tables of the other switches are modified to implement the instruction.

17 Claims, 4 Drawing Sheets

Forwarding Database (FDB) Table

| MAC addr | Local Port ID | Node ID (Source) | Flags |
|---|---|---|---|
| 10:11:12:13:14:15 | 5 | 100 | 0 |
| ... | | | |

FIG. 2

Reserved Synchronization Packet

| Source Identifier 42 | Sequence number 44 | | |
|---|---|---|---|
| MAC1  47 | Local port ID  48 | Flags=0x1 (New) | 49 |
| MAC2  47 | Local port ID  48 | Flags=0x2 (Delete) | 49 |
| MAC3  47 | Local port ID  48 | Flags=0x4 (Migrate) | 49 |

FIG. 3

Node Sequence Table

| Source Identifier | Sequence Number |
|---|---|
| 100 | 789 |
| ... | |

FIG. 4

Negative Acknowledgement (NACK) Packet

| Dest_ID | Source_ID | NACK | Seq number |
|---|---|---|---|

FIG. 5

POPULATING FORWARDING DATABASE TABLES IN A FABRIC ENVIRONMENT

BACKGROUND

Field of the Invention

The present invention relates to managing data in a forwarding database table of a network switch.

Background of the Related Art

A switched fabric is a network topology in which interconnected network switches enable network traffic among a large number of individual network devices such as servers. Each of the individual network devices is connected to one of the switches. However, each switch may be interconnected with one or more other switches. In this manner, a communication, such as an Ethernet frame, may be sent from one network device to another network device through more than one switch. Accordingly, the forwarding of such communications between switches is most efficiently managed if each switch has a forwarding database table that identifies the network location of various network devices.

BRIEF SUMMARY

One embodiment of the present invention provides a method comprising maintaining a forwarding database table in each of a plurality of interconnected switches forming a network, wherein each forwarding database table includes one or more records, each record identifying a media access control address, a port identifier, and a source identifier, and wherein the plurality of switches includes a first switch having a first forwarding database table. The method further comprises receiving a frame from a first network device at a first port of the first switch, wherein the frame includes a media access control address of the first network device. Still further, the method comprises preparing a synchronization packet including the media access control address identifying the first network device, a port identifier identifying the first port, a source identifier identifying the first switch and an instruction, and wherein the synchronization packet is prepared by the first switch in response to determining that the media access control address is not associated with the first switch in a record of the first forwarding database table. In addition, the method comprises sending the synchronization packet from the first switch to each other switch of the plurality of switches, and modifying the forwarding database table of one or more of the switches that receive the synchronization packet to implement the instruction included in the synchronization packet.

BRIEF DESCRIPTION OF THE SEVERAL VIEWS OF THE DRAWINGS

FIG. 2 is an illustration of a forwarding database table.

FIG. 3 is an illustration of a synchronization packet.

FIG. 4 is an illustration of a node sequence table.

FIG. 5 is an illustration of a negative acknowledgement packet.

DETAILED DESCRIPTION

Figure 1:
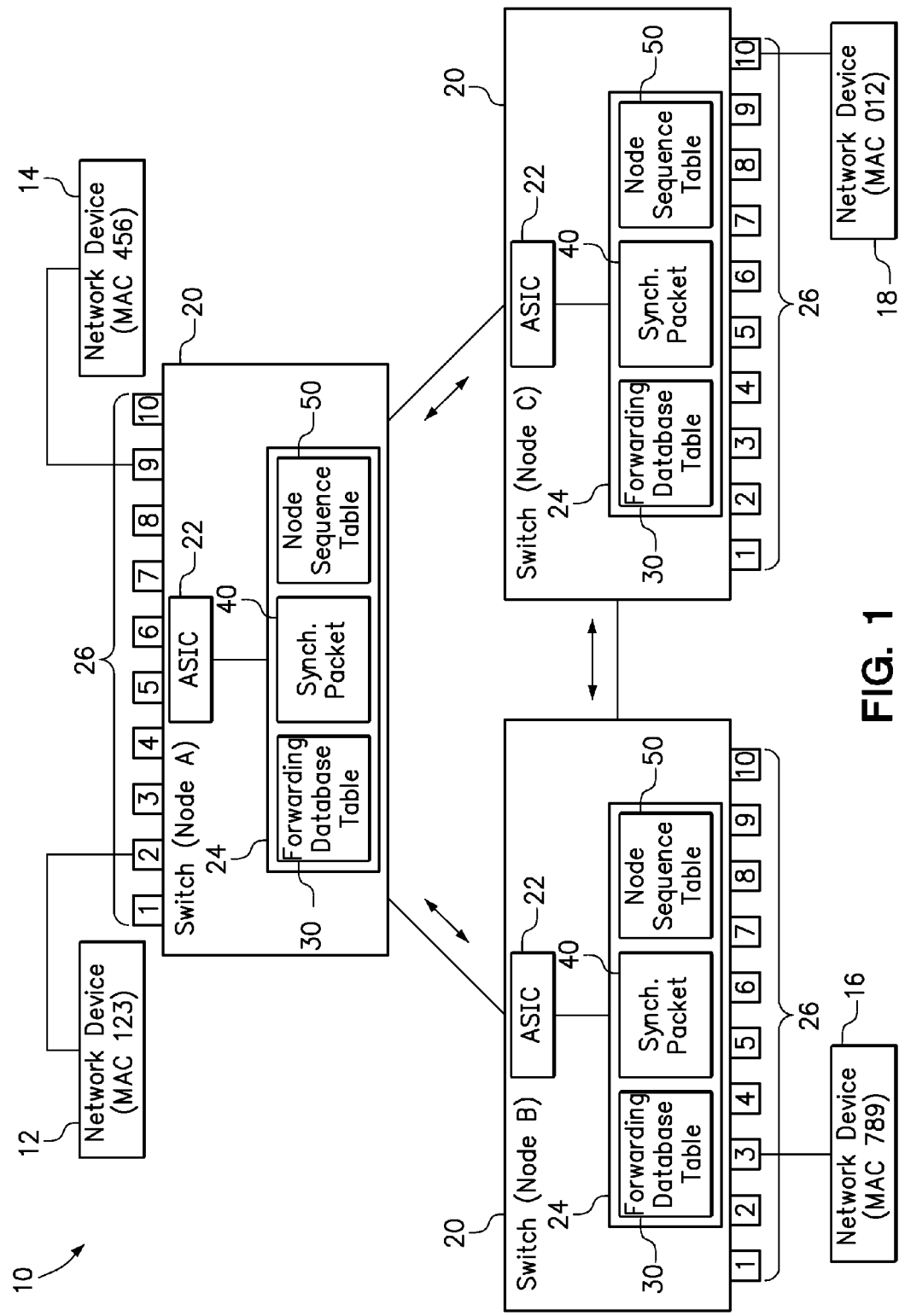
FIG. 1 is a diagram of a network having a plurality of switches forming a generic fabric topology.

One embodiment of the present invention provides a method comprising maintaining a forwarding database (FDB) table in each of a plurality of interconnected switches forming a network, wherein each forwarding database table includes one or more records, each record identifying a media access control address, a port identifier, and a source identifier, and wherein the plurality of switches includes a first switch having a first forwarding database table. The method further comprises receiving a frame from a first network device at a first port of the first switch, wherein the frame includes a media access control (MAC) address of the first network device. Still further, the method comprises preparing a synchronization packet including the media access control address identifying first network device, a port identifier identifying the first port, a source identifier identifying the first switch and an instruction, and wherein the synchronization packet is prepared by the first switch in response to determining that the media access control address is not associated with the first switch in a record of the first forwarding database table. In addition, the method comprises sending the synchronization packet from the first switch to each other switch of the plurality of switches, and modifying the forwarding database table of one or more of the switches that receive the synchronization packet to implement the instruction included in the synchronization packet.

The plurality of interconnected switches may form a network having any known topology including, without limitation, full-mesh, star, or ring topology. The topology is implemented by network switches located at each node of the network, where each switch may be identified by a unique source identifier. Furthermore, each individual switch may maintain a forwarding database table that provides the network location of each network device that is connected to one of the switches. For each network device, the forwarding database table may include the unique media access control address assigned to the network device, a source identifier that uniquely identifies the switch to which the network device is connected, and a local port identifier that identifies the port of the identified switch to which the network device is connected.

A frame, such as an Ethernet frame, is a network communication that includes a source address, a destination address and a data packet. The source and destination addresses may be media access control addresses. When a switch receives a frame from a network device having a media access control address that is not yet in the switch's forwarding database, the switch will form a synchronization packet. Furthermore, when a switch receives a frame from a network device having a media access control address that is already in the switch's forwarding database, but the address is associated with another switch, then the switch will form a synchronization packet or add an entry to a synchronization packet that has not yet been sent. The synchronization packet may be sent to all neighboring nodes (switches) at any point in time so that each node in the network will have a common view of the local network. Preferably, the synchronization packet may be sent when a specified number of MAC events (either Add, Delete, or Migrate) have accumulated, or upon expiration of a time period. Over time, a switch may form a synchronization packet or an entry into a synchronization packet at any time in response to a MAC event. The term "MAC event" refers to detecting the presence or absence of a network device with a unique MAC address. When the synchronization packet has accumulated multiple MAC events, the synchronization packet will include a source identifier identifying the switch and an entry for each event, where each entry includes the media access control address identifying the network device affected by the MAC event, a port identifier identifying the affected port, and an instruction. For example, the instruction may be selected from add a record with the media access control address, delete a record with the media access control address, and migrate a record with the media access control address.

Accordingly, synchronization packets are used to update the data in the forwarding database table of each switch so that each switch can efficiently forward frames being sent over the network directed to the destination address identified in the frame. However, if a synchronization packet is not received by one or more of the switches, then the affected switch does not have the benefit of the data in the "missing synchronization packet." In the event of a "missing synchronization packet", the affected switch may forward a frame to the wrong port and has the potential to disrupt the normal functionality of the entire system.

Each new synchronization packet that is sent by a specific switch (source node) will include both the source identifier and a sequence number. Each switch keeps track of their own sequence number which is incremented for use in subsequent synchronization packets sent by that switch. As the specific switch sends additional synchronization packets over time, each subsequent synchronization packet preferably has a sequence number that is incremented by 1. Each of the other switches (receiving nodes) in the network will store the source identifier and the last received sequence number. In fact, each switch may maintain a node sequence table that lists each switch by its source identifier and the sequence number that was in the most recent synchronization packet to be received from the source. Each time a given switch discovers a new switch in the network, such as by receiving a synchronization packet from the new switch for the first time, then the given switch will add the source identifier for the new switch to the given switch's node sequence table along with the sequence number in the synchronization packet.

Where the plurality of switches includes a second switch, the method may further comprise the second switch receiving a second frame from a second network device, wherein the frame identifies the media access control address of the first network device as a destination for the second frame. The second switch then accesses the forwarding database table in the second switch to locate the record that includes the media access control address of the first network device, the port identifier identifying the first port and the source identifier identifying the first switch. The second switch may then forward the second frame to the first network device at the first port of the first switch.

In various embodiments of the invention, the synchronization packet may further include a sequence number that the first switch increments each time the first switch sends out a synchronization packet. It should be recognized that each individual switch may send out synchronization packets including a sequence number that is incremented by the individual switch each time it sends out a synchronization packet.

The method may further comprise maintaining a node sequence table in each of the plurality of interconnected switches. The node sequence table of any one of the switches may identify, for other switches in the network, the source identifier of the other switch and a sequence number of a synchronization packet last received from the other switch. Accordingly, the node sequence table maintained by an individual switch will identify the source identifier of any switch from which the individual switch has ever received a synchronization packet. The node sequence table will also associate each source identifier with a sequence number that was in the synchronization packet last received from the switch with that source identifier. As used herein, the term "associated" or "association" refers to a logical relationship of two data items (i.e., identifiers, sequence numbers) that are in a common record of a database or table, or that are otherwise related by a cross-reference that links more than one record.

In one implementation, each individual switch that receives the synchronization packet from the first switch may independently determine whether the node sequence table for the individual switch already identifies the source identifier in the synchronization packet. In response to independently determining that the node sequence table maintained by the individual switch already identifies the source identifier identified in the synchronization packet, each individual switch may further independently determine whether the sequence number associated with the source identifier in the synchronization packet is in sequence with a sequence number that is stored in the node sequence table of the individual switch in association with the source identifier of the first switch. The forwarding database table of an individual switch that receives the synchronization packet may be modified to include a record identifying the media access control address, the port identifier, and the source identifier only in response to determining that the sequence number in the synchronization packet is in sequence with the sequence number that is stored in the node sequence table of the individual switch in association with the source identifier of the first switch. The method may then update the sequence number that is stored in the node sequence table of each individual switch in association with the source identifier of the first switch to the sequence number received in the synchronization packet.

In another implementation, each individual switch that receives the synchronization packet determines whether the node sequence table for the individual switch already identifies the source identifier in the synchronization packet. In response to one of the switches independently determining that the node sequence table of the individual switch does not identify the source identifier identified in the synchronization packet, adding the source identifier to the node sequence table of the switch and sending a negative acknowledgement packet to the first switch requesting a copy of the forwarding database table of the first switch.

A missing synchronization packet may be detected in two ways. First, a switch may detect that it missed (i.e., did not receive) a synchronization packet in response to that switch receiving a synchronization packet with useful data that is not reflected in the switch's forwarding database table. Such a synchronization packet will have a sequence number that is not in sequence with the sequence number associated with the source switch in the receiving switch's node sequence table. Second, a switch may detect that it missed (i.e., did not receive) a synchronization packet in response to that switch receiving an empty reserved synchronization packet from another switch (with source identifier and the next sequence number), where the empty synchronization packet does not include any new MAC events. Sending an empty synchronization packet causes the receiving switch to lookup the source identifier in the node sequence table and determine whether the sequence number in the empty synchronization packet is in sequence with the sequence number associated with the source identifier in the node sequence table. For example, assume that a node sequence table includes an entry for a source identifier 100 having a sequence number of 789. If the empty synchronization packet includes source identifier 100 and a sequence number of 790, then the previous synchronization packet was in fact received. However, if the empty synchronization packet includes source identifier 100 and a sequence number of 791, then the previous synchronization packet having a sequence number of 790 was not received. Sending an empty synchronization packet is a way for a given switch to be sure that the other switches have received the synchronization packets that the given switch had previously sent. Preferably, the switches in a network will periodically send an empty synchronization packet in order to detect any missing synchronization packet.

In one option, the method may further include each individual switch that receives an empty synchronization packet independently determining whether the sequence number in the empty synchronization packet is in sequence with the sequence number that is stored in the node sequence table of the individual switch in association with the source identifier of the first switch. Accordingly, any one or more of the switches that receives the empty synchronization packet may send a negative acknowledgement packet to the first switch requesting that the first switch resend one or more synchronization packets in response to determining that the sequence number in the empty synchronization packet is not in sequence with the sequence number that is stored in the node sequence table of the switch in association with the source identifier of the first switch.

In another option, the method may further include sending an empty synchronization packet from the first switch to each other switch of the plurality of switches, wherein the empty synchronization packet includes the source identifier of the first switch and a sequence number that is incremented from the last synchronization packet sent by the first switch. Accordingly, each individual switch that receives the empty synchronization packet independently determines whether the sequence number in the empty synchronization packet is in sequence with a sequence number that is stored in the node sequence table of the individual switch in association with the source identifier of the first switch. The first switch may send an empty synchronization packet on a periodic basis to make sure that other switches have received all of the synchronization packets send by the first switch.

In yet another option, the plurality of switches includes a third switch, and the method may further include the third switch determining that the sequence number in the empty synchronization packet is not in sequence with a sequence number that is stored in a node sequence table of the third switch in association with the source identifier of the first switch. Then, in response to making this determination, the third switch sends a negative acknowledgement packet to the first switch requesting that the first switch resend one or more synchronization packets to the third switch.

As previously discussed, a synchronization packet may include an instruction to migrate a record with the media access control address. In one embodiment, each individual switch, in response to receiving a synchronization packet including an instruction to migrate a record with the MAC address, independently determines whether the MAC address associated with the instruction to migrate is stored in the forwarding database table of the individual switch in association with the source identifier of the individual switch. Accordingly, an individual switch, in response to determining that the MAC address is stored in the forwarding database table of the switch in association with the source identifier of the switch, deletes the MAC address entry or record from the forwarding database table of the individual switch and sends a synchronization packet to each of the other switches with an instruction to delete a record with the MAC address from the other switches' respective forwarding database tables.

In a further embodiment, in response to receiving the frame from the first network device at the first port of the first switch, the first switch determines whether the media access control address of the first network device is included in an entry or record of the forwarding database table of the first switch in association with one of the other switches. In response to determining that the media access control address of the first network device is included in an entry of the forwarding database table of the first switch in association with one of the other switches, the first switch sends a synchronization packet identifying the MAC address of the first network device and including a migration instruction. In other words, the first switch has independently determined that the first network device has migrated from another switch, as recorded in the forwarding database table of the first switch, to the first switch. In response to receiving the synchronization packet identifying the MAC address and including the migration instruction, the switch that is associated with the MAC address of the first network device in the forwarding database table then sends a synchronization packet identifying the MAC address and including a deletion instruction. In this manner, the switch that was previously connected to the first network device takes the responsibility for instructing all of the other switches to delete any record in their respective forwarding database tables that associate the first network device with the switch that was previously connected to the first network device. Preferably, each switch will only delete a MAC address associated with another switch in the forwarding database table in response to receiving a deletion instruction in a synchronization packet that was sent from the switch associated with the MAC address in the forwarding database table. For this reason, each individual switch will only implement an aging method, to delete MAC addresses from a forwarding database table, for MAC addresses that are in the forwarding database table in association with the individual switch.

Embodiments of the method may further comprise each individual switch, in response to receiving the synchronization packet identifying the MAC address and including the migration instruction, determining whether the MAC address identified in the synchronization packet is identified in the forwarding database table of the individual switch in association with the individual switch. In response to determining that the MAC address identified in the synchronization packet is not identified in the forwarding database table of the individual switch in association with the individual switch, the individual switch ignoring the migration instruction.

In further option, an individual switch may delete a MAC address from its forwarding table in response to a period of time passing since the individual switch has received a frame from a network device associated with the MAC address and determining that the MAC address is identified in the forwarding database table in association with the individual switch.

Another embodiment of the present invention provides a computer program product for comprising a non-transitory computer readable storage medium having program instructions embodied therewith, the program instructions executable by a processor to cause the processor to perform a method. The method comprises maintaining a forwarding database table in each of a plurality of interconnected switches forming a network, wherein each forwarding database table includes one or more records, each record identifying a media access control address, a port identifier, and a source identifier, and wherein the plurality of switches includes a first switch having a first forwarding database table. The method further comprises receiving a frame from a first network device at a first port of the first switch, wherein the frame includes a media access control address of the first network device. Still further, the method comprises preparing a synchronization packet including the media access control address identifying first network device, a port identifier identifying the first port, a source identifier identifying the first switch and an instruction, wherein the synchronization packet is prepared by the first switch in response to determining that the media access control address is not associated with the first switch in a record of the first forwarding database table, and wherein the instruction is selected from add a record with the MAC address, delete a record with the MAC address, and migrate a record with the MAC address. In addition, the method comprises sending the synchronization packet from the first switch to each other switch of the plurality of switches, and modifying the forwarding database table of one or more of the switches that receive the synchronization packet to implement the instruction included in the synchronization packet.

The foregoing computer program products may further include computer readable program code for implementing or initiating any one or more aspects of the methods described herein. However, a separate description of the methods will not be duplicated in the context of a computer program product.

FIG. 1 is a diagram of a network fabric 10 having a plurality of interconnected switches 20 forming a generic fabric topology. The invention may be implemented in a network fabric having any topology and any number of switches. In accordance with various embodiments of the invention described herein, each switch 20 includes an application specific integrated circuit (ASIC) 22 that can execute logic and control various functions of the switch. The ASIC 22 is in communication with memory 24 that stores a forwarding database table 30, one or more synchronization packet 40, and a node sequence table 50.

Each switch 20 further includes a plurality of ports 26, where each port 26 is adapted for selectively connecting with any of the network devices 12, 14, 16, 18. While only a few network devices are shown, these are only representative network devices and the invention may be implemented with a greater or fewer number of network devices. Furthermore, the connections between the network devices and the switches, and even the connection between two switches, are illustrated as a physical connections, such as cables, the invention may also be implemented using wireless connections or combinations of physical and wireless connections.

FIG. 2 is an illustration of a forwarding database table 30. Each switch will store and update a forwarding database table 30 and use its own locally-stored forwarding database table to determine how to forward frames that the particular switch receives at one of its ports. Ideally, the forwarding database table of each switch could be kept perfectly up-to-date so that each forwarding database table contains exactly the same information. However, a delay in sending a synchronization packet, a loss of a synchronization packet, and the ever-changing connection of network devices may lead to small differences at any particular point in time. The individual switch relies only on its own forwarding database table and makes independent determinations how and where to forward frames solely on the basis of data in its locally stored forwarding database table.

The illustrated forwarding database table 30 includes a plurality of records. Each record is illustrated as a horizontal row including various fields. A first column 32 identifies a MAC address for a network device, a second column 34 identifies a local port identifier (ID) where the network device is connected, a third column 36 identifies a node identifier or source identifier for a switch where the network device is connected, and a fourth column 38 includes any flags regarding the record (such as a flag indicating whether the record is locked against aging). While each switch will locally store and maintain its own forwarding database table, the forwarding database table will include a record for each network device connected to any of the switches in the network unless the individual switch has not yet received a synchronization packet with that information.

FIG. 3 is an illustration of a synchronization packet 40. Any of the switches in the network may generate a synchronization packet from time-to-time, or generate a new entry into a synchronization packet from time-to-time, in response to a MAC event, such as detecting a new network device connection to an individual switch (a "new" or "add" event), determining that a network device is no longer connected to the individual switch (a "remove" or "delete" event), or determining that a network device is now connected to a different switch in the network (a "migrate" event).

The illustrated synchronization packet 40 includes a source identifier 42 that identifies the switch that generated the synchronization packet 40 and a sequence number 44 that the switch sequentially assigns to any synchronization packet 40 that it generates. Each switch independently maintains its own sequence number and increments the sequence number with each synchronization packet 40 that it generates and sends out to the other switches in the network.

The synchronization packet 40 further includes one or more records 46 of MAC events. Each record is illustrated as a row including a MAC address 47, a local port ID 48, and a flag or instruction 49. As shown, MAC 1 is associated with a flag or instruction "0x1" instructing each of the other switches that will receive the synchronization packet 40 to add a record to their forwarding database table, where the record will include the MAC address (MAC1) 47, the associated local port ID 48 and the source identifier 42. In this example, the synchronization packet 40 includes a second record instructing other switches to delete a particular record from their forwarding database tables, where the particular record to be deleted is identified by the MAC address (MAC2). A third record of the synchronization packet 40 includes an instruction that the network device associated with the identified MAC address (MAC3) has migrated to the switch that generated the synchronization packet 40. As described in embodiments of the invention, only the switch that originally instructed other switches to add a record may later instruct the other switches to delete the record.

FIG. 4 is an illustration of a node sequence table 50. Each individual switch maintains a node sequence table with a separate record for each of the other switches from which the individual switch has received a synchronization packet. The source identifier of those other switches is shown in a first column 52 and the sequence number in the synchronization packet most recently received from the identified switch is shown in a second column 54. In accordance with various embodiments, an individual switch will, upon receiving a synchronization packet from another given switch, check its locally stored node sequence table to determine whether the sequence number in the synchronization packet is in sequence with the sequence number last receive from that given switch. In an example where sequence number are incremented by ascending integer numbers, the individual switch that might store the node sequence table 50 of FIG. 4 would expect the next synchronization packet to be received from another switch with source identifier "100" to include a sequence number of "790" (i.e., one integer number increment higher that the stored sequence number of "789").

FIG. 5 is an illustration of a negative acknowledgement (NACK) packet 60. For example, if a switch receives a synchronization packet with a discontinued sequence number (i.e., any sequence number other than the next sequential number), then the receiving switch will send a NACK 60 to request the source switch to provide the missing data. Optionally, the source switch may resend one or more missing synchronization packet or send its entire forwarding database table. Optionally, the negative acknowledgement packet may contain multiple missing sequence numbers.

In the context of a NACK 60, the "source ID" 64 preferably identifies the switch that is sending the NACK (i.e., the source of the NACK), the destination ID 62 identifies the switch that is to receive the NACK, the instruction (NACK) 66 tells the destination switch that information is missing, and the sequence number 68 tells the destination switch what information is missing and requested. The sequence number 68 included in the NACK packet format can be anything from the last received sequence number to a code requesting the entire table update.

Figure 6:
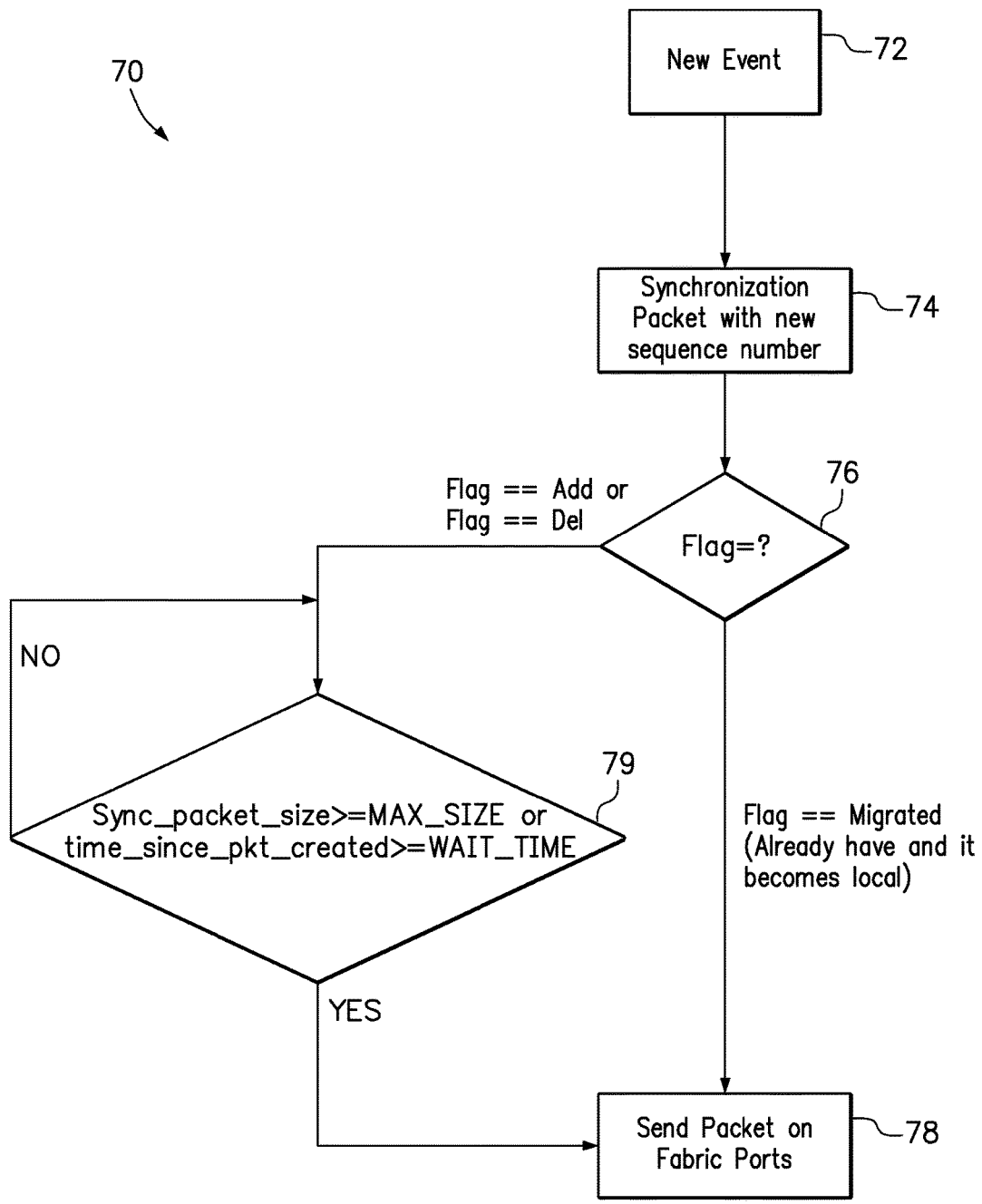
FIG. 6 is a flowchart of a method for responding to a MAC event.

FIG. 6 is a flowchart of a method 70 for a switch responding to a MAC event. In step 72, an individual switch detects a new MAC event involving a MAC address on a local data port. In step 74, the switch will prepare or modify a synchronization packet identifying the MAC address and including a new sequence number that is, for example, incrementally increased. In step 76, the switch determines what type of flag or instruction to include in the synchronization packet in association with the MAC address. If the flag or instruction indicates that the network device associated with the MAC address has migrated, then the synchronization packet includes a migration instruction associated with the MAC address and the packet is sent to other switches in step 78. On the other hand, if the flag or instruction instructs the other switches to "add" or "delete" records in their separate forwarding databases that include the MAC address, then the process proceeds with step 79. In step 79, the synchronization packet is, in this non-limiting example, held until either of two conditions is met. A first condition is that the synchronization packet has a maximum size (i.e., number of MAC event records), and a second condition is that a predetermined period of time has passed since the synchronization packet was created. Upon satisfaction with the user-defined conditions of step 79, the synchronization packet is sent in step 78.

An example of migration event may be illustrated by considering a laptop computer that is initially connected to a network by a first port of a first switch and then subsequently moves to another physical position where it becomes connected to the network by a second port of a second switch. Initially, the first switch learned the MAC address on the first port. But when the laptop is moved, the same MAC address is then learned by the second switch on the second port. The second switch recognizes the event as a MAC migration event, because the MAC address is already stored in the second switches forwarding database in association with the first switch. The fact that the second switch is now detecting the MAC address on its own port tells the second switch that the laptop has migrated from the first switch to the second switch.

Figure 7:
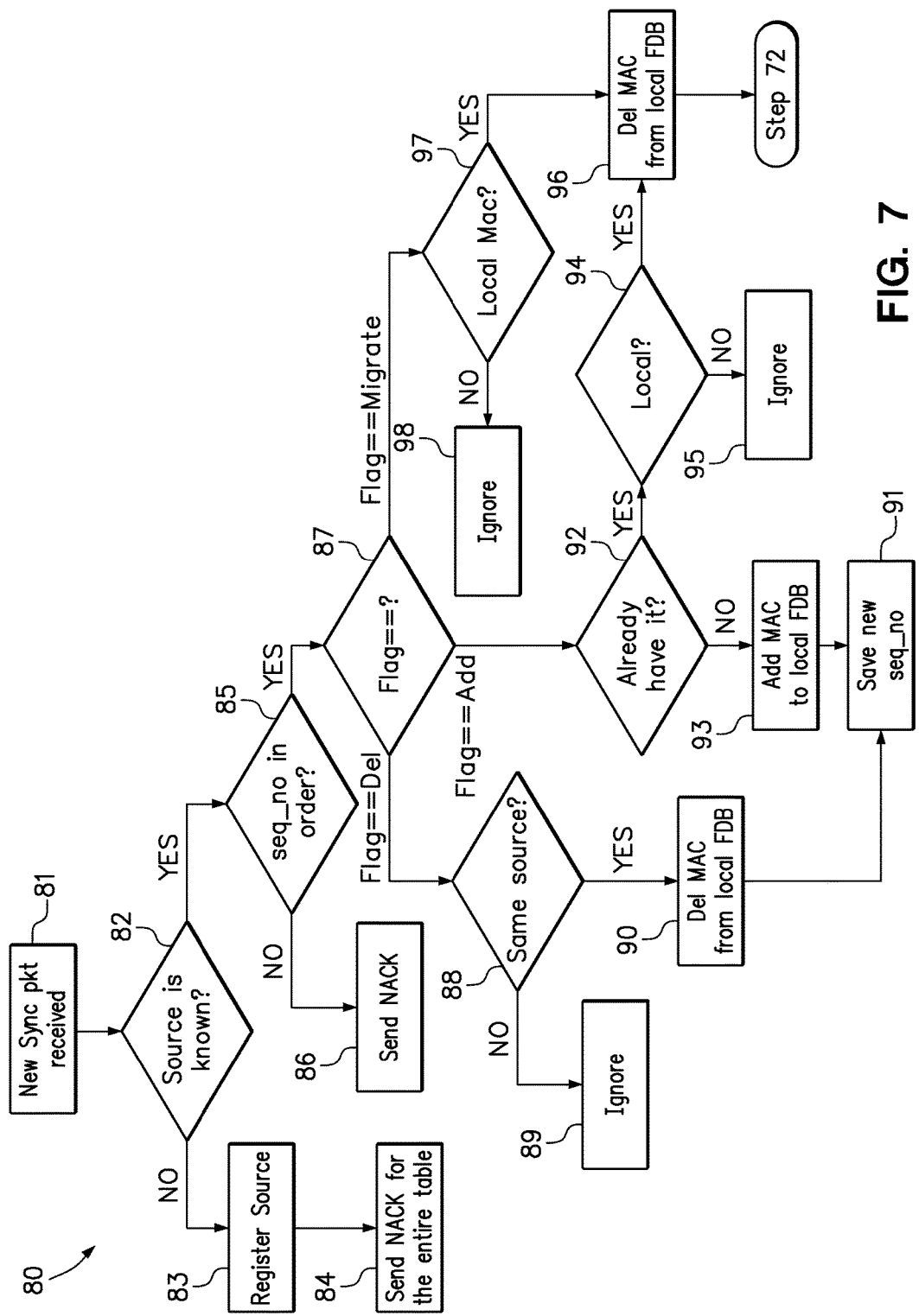
FIG. 7 is a flowchart of a method for handling receipt of a synchronization packet.

FIG. 7 is a flowchart of a method 80 for handling receipt of a synchronization packet. In step 81, a new synchronization packet is received. While a synchronization packet may be received by every switch in the network, except for the switch that sent the synchronization packet, the method 80 represents the logic that each switch independently performs in response to receiving a synchronization packet. As used herein, the work "new" refers to a synchronization packet that is sent by a switch other than in response to a negative acknowledgement (NACK). For example, the method 70 of FIG. 6 results in sending a new synchronization packet in step 78.

In step 82, an individual switch that has received the synchronization packet in step 81 will determine whether the source identifier in the synchronization packet is known (i.e., whether the source identifier is stored in the node sequence table of the switch). If not, then step 83 registers the source identifier in the node sequence table and step 84 sends a NACK to the source associated with the source identifier, where the NACK requests that the source send the entire forwarding database table of the source. However, if the source identifier is known to the switch per step 82, then step 85 determines whether the sequence number in the synchronization packet is in sequence with the sequence number associated with the source identifier in the node sequence table of the switch. If not, then step 86 sends a NACK to the source associated with the source identifier requesting any missing synchronization database table. It should be recognized that the use of sequence number to trigger a NACK packet allows the method to recover from any packet loss. However, if the sequence number in the synchronization packet is in sequence per step 85, then the method proceeds to step 87. Where a synchronization packet includes multiple records of MAC events, steps 87-98 may be repeated for each of the records.

In step 87, the method determines whether the flag or instruction associated with the MAC event in the synchronization packet is "delete", "add" or "migrate." If the instruction is "delete", then the method proceeds to step 88 to determine whether the source identifier in the synchronization packet is the same as the source identifier associated with MAC address in the forwarding database table of the switch. In other words, a "delete" instruction is only implemented if the delete instruction comes from the same source that is associated with the MAC address in the forwarding database table of the switch. If the "delete" instruction is not from the same source, then step 89 ignores the "delete" instruction. However, if the "delete" instruction is from the same source, then, in step 90, the switch will implement the instruction by deleting a record for the forwarding database table that includes the MAC address. Then, in step 91, the switch will save the new sequence number from the synchronization packet in the node sequence table of the switch.

If step 87 determines that the synchronization packet includes an "add" instruction, and the switch's forwarding database table does not already have a record with that MAC address per step 92, then step 93 adds the MAC address to the forwarding database table of the switch and step 91 saves the new sequence number from the synchronization packet in the node sequence table of the switch. However, if the switch's forwarding database table already has a record with that MAC address per step 92, then step 94 determines whether the MAC address is associated with the switch (i.e., whether the local switch previously learned the MAC address that has now been learned by another switch and announced via the synchronization packet). If not, then step 95 ignores the "add" instruction. However, if the MAC address associated with the "add" instruction is already in the forwarding database table of the switch and is associated with the source identifier of the switch, then step 96 deletes the record with the MAC address from the switch's local forwarding database table and proceeds to step 72 of FIG. 6 to generate a synchronization packet that instructs other switches to delete their own records with the MAC address from their own forwarding database tables.

If step 87 determines that the synchronization packet includes a "migrate" instruction, then step 97 determines whether the MAC address associated with the "migrate" instruction is associated with the source identifier of the switch in the forwarding database table of the switch. If not, then step 98 ignores the instruction. However, if the MAC address associated with the "migrate" instruction is associated with the source identifier of the switch in the forwarding database table of the switch, then step 96 deletes the record with the MAC address from the switch's local forwarding database table and proceeds to step 72 of FIG. 6 to generate a synchronization packet that instructs other switches to delete their own records with the MAC address from their own forwarding database tables.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

maintaining a forwarding database table in each of a plurality of interconnected switches forming a network, wherein each forwarding database table includes one or more records, each record identifying a media access control address, a port identifier, and a source identifier, and wherein the plurality of switches includes a first switch having a first forwarding database table;

maintaining a node sequence table in each of the plurality of interconnected switches, wherein the node sequence table of any one of the switches identifies, for other switches in the network, the source identifier of the other switch and a sequence number of a synchronization packet last received from the other switch;

receiving a frame from a first network device at a first port of the first switch, wherein the frame includes a media access control address of the first network device;

preparing a synchronization packet including the media access control address identifying first network device, a port identifier identifying the first port, a source identifier identifying the first switch, a sequence number that the first switch increments each time the first switch sends out a synchronization packet and an instruction, and wherein the synchronization packet is prepared by the first switch in response to determining that the media access control address is not associated with the first switch in a record of the first forwarding database table;

sending the synchronization packet from the first switch to each other switch of the plurality of switches;

each switch that receives the synchronization packet determining whether the sequence number in the synchronization packet is in sequence with the sequence number that is stored in the node sequence table of the switch in association with the source identifier of the first switch;

modifying the forwarding database table of one or more of the switches that receive the synchronization packet to implement the instruction included in the synchronization packet in response to determining that the sequence number in the synchronization packet is in sequence with the sequence number that is stored in the node sequence table of the switch in association with the source identifier of the first switch; and any one or more of the switches that receives the synchronization packet sending a negative acknowledgement packet to the first switch requesting that the first switch resend one or more synchronization packets in response to determining that the sequence number in the synchronization packet is not in sequence with the sequence number that is stored in the node sequence table of the switch in association with the source identifier of the first switch.

2. The method of claim 1, wherein the forwarding database table identifies a network location of each network device that is connected to one of the switches.

3. The method of claim 2, wherein the forwarding database table includes, for each network device that is connected to one of the switches, a unique MAC address assigned to the network device, a source identifier that uniquely identifies the switch to which the network device is connected, and a local port identifier that identifies the port of the identified switch to which the network device is connected.

4. The method of claim 1, wherein the first switch sends the synchronization packet in response to expiration of a time period.

5. The method of claim 1, wherein the first switch sends the synchronization packet in response to accumulating a specified number of multiple media access control events in the synchronization packet.

6. The method of claim 1, wherein the synchronization packet further includes an instruction for each media access control address in the synchronization packet, and wherein the instruction is selected from add a record with the media access control address, delete a record with the media access control address, and migrate a record with the media access control address.

7. The method of claim 1, wherein the plurality of switches includes a second switch, the method further comprising:

the second switch receiving a second frame from a second network device, wherein the frame identifies the media access control address of the first network device as a destination for the second frame;

accessing the forwarding database table in the second switch to locate the record that includes the media access control address of the first network device, the port identifier identifying the first port and the source identifier identifying the first switch; and forwarding the second frame to the first network device at the first port of the first switch.

8. The method of claim 1, further comprising:
periodically sending an empty synchronization packet from the first switch to each other switch of the plurality of switches, wherein the empty synchronization packet includes the source identifier of the first switch and a sequence number that is incremented from the last synchronization packet sent by the first switch; and
each switch that receives the empty synchronization packet determining whether the sequence number in the empty synchronization packet is in sequence with a sequence number that is stored in the node sequence table of the switch in association with the source identifier of the first switch.

9. The method of claim 1, further comprising:
sending an empty synchronization packet from the first switch to each other switch of the plurality of switches, wherein the empty synchronization packet includes the source identifier of the first switch and a sequence number that is incremented from the last synchronization packet sent by the first switch; and
each switch that receives the empty synchronization packet determining whether the sequence number in the empty synchronization packet is in sequence with a sequence number that is stored in the node sequence table of the switch in association with the source identifier of the first switch.

10. The method of claim 9, wherein the plurality of switches includes a third switch, the method further comprising:
the third switch determining that the sequence number in the empty synchronization packet is not in sequence with a sequence number that is stored in a node sequence table of the third switch in association with the source identifier of the first switch; and
the third switch sending a negative acknowledgement packet to the first switch requesting that the first switch resend one or more synchronization packets to the third switch.

11. The method of claim 1, further comprising:
each switch, in response to receiving a synchronization packet including an instruction to migrate a record with the MAC address, determining whether the MAC address associated with the instruction to migrate is stored in the forwarding database table of the switch in association with the source identifier of the switch; and
each switch, in response to determining that the MAC address is stored in the forwarding database table of the switch in association with the source identifier of the switch, deleting the MAC entry from the forwarding database table of the switch and sending a synchronization packet to each of the other switches with an instruction to delete the MAC entry from the forwarding database table.

12. The method of claim 1, further comprising:
in response to receiving the frame from the first network device at the first port of the first switch, determining whether the media access control address of the first network device is included in an entry of the forwarding database table in association with one of the other switches;
in response to determining that the media access control address of the first network device is included in an entry of the forwarding database table in association with one of the other switches, the first switch sending a synchronization packet identifying the MAC address and including a migration instruction; and
in response to receiving the synchronization packet identifying the MAC address and including the migration instruction, the switch that is associated with the MAC address in the forwarding database table sending a synchronization packet identifying the MAC address and including a deletion instruction.

13. The method of claim 12, wherein each switch will only delete a MAC address associated with another switch in the forwarding database table in response to receiving a deletion instruction in a synchronization packet that was sent from the switch associated with the MAC address in the forwarding database table.

14. The method of claim 12, further comprising:
each switch, in response to receiving the synchronization packet identifying the MAC address and including the migration instruction, determining whether the MAC address identified in the synchronization packet is identified in the forwarding database table of the switch in association with the switch; and
in response to determining that the MAC address identified in the synchronization packet is not identified in the forwarding database table of the switch in association with the switch, the switch ignoring the migration instruction.

15. The method of claim 1, further comprising:
a switch deleting a MAC address from a forwarding table in response to a period of time passing since receiving a frame from a network device associated with the MAC address and determining that the MAC address is identified in the forwarding database table in association with the switch.

16. A method, comprising:
maintaining a forwarding database table in each of a plurality of interconnected switches forming a network, wherein each forwarding database table includes one or more records, each record identifying a media access control address, a port identifier, and a source identifier, and wherein the plurality of switches includes a first switch having a first forwarding database table;
maintaining a node sequence table in each of the plurality of interconnected switches, wherein the node sequence table of any one of the switches identifies, for other switches in the network, the source identifier of the other switch and a sequence number of a synchronization packet last received from the other switch;
receiving a frame from a first network device at a first port of the first switch, wherein the frame includes a media access control address of the first network device;
preparing a synchronization packet including the media access control address identifying first network device, a port identifier identifying the first port, a source identifier identifying the first switch, a sequence number that the first switch increments each time the first switch sends out a synchronization packet and an instruction, and wherein the synchronization packet is prepared by the first switch in response to determining that the media access control address is not associated with the first switch in a record of the first forwarding database table;
sending the synchronization packet from the first switch to each other switch of the plurality of switches;
each switch that receives the synchronization packet from the first switch determining whether the node sequence table for the switch already identifies the source identifier in the synchronization packet;

in response to determining that the node sequence table already identifies the source identifier identified in the synchronization packet, each switch further determining whether the sequence number associated with the source identifier in the synchronization packet is in sequence with a sequence number that is stored in the node sequence table of the switch in association with the source identifier of the first switch;

modifying the forwarding database table of one or more of the switches that receive the synchronization packet to implement the instruction included in the synchronization packet only in response to determining that the sequence number in the synchronization packet is in sequence with the sequence number that is stored in the node sequence table of the switch in association with the source identifier of the first switch; and updating the sequence number that is stored in the node sequence table of each switch in association with the source identifier of the first switch to the sequence number received in the synchronization packet.

17. A method, comprising:

maintaining a forwarding database table in each of a plurality of interconnected switches forming a network, wherein each forwarding database table includes one or more records, each record identifying a media access control address, a port identifier, and a source identifier, and wherein the plurality of switches includes a first switch having a first forwarding database table;

maintaining a node sequence table in each of the plurality of interconnected switches, wherein the node sequence table of any one of the switches identifies, for other switches in the network, the source identifier of the other switch and a sequence number of a synchronization packet last received from the other switch;

receiving a frame from a first network device at a first port of the first switch, wherein the frame includes a media access control address of the first network device;

preparing a synchronization packet including the media access control address identifying first network device, a port identifier identifying the first port, a source identifier identifying the first switch, a sequence number that the first switch increments each time the first switch sends out a synchronization packet and an instruction, and wherein the synchronization packet is prepared by the first switch in response to determining that the media access control address is not associated with the first switch in a record of the first forwarding database table;

sending the synchronization packet from the first switch to each other switch of the plurality of switches;

each switch that receives the synchronization packet determining whether the node sequence table for the switch already identifies the source identifier in the synchronization packet;

in response to one of the switches determining that the node sequence table of the switch does not identify the source identifier identified in the synchronization packet, adding the source identifier to the node sequence table of the switch and sending a negative acknowledgement packet to the first switch requesting a copy of the forwarding database table of the first switch; and in response to one of the switches determining that the node sequence table of the switch identifies the source identifier identified in the synchronization packet, modifying the forwarding database table of one or more of the switches that receive the synchronization packet to implement the instruction included in the synchronization packet.

* * * * *